Patented May 26, 1925.

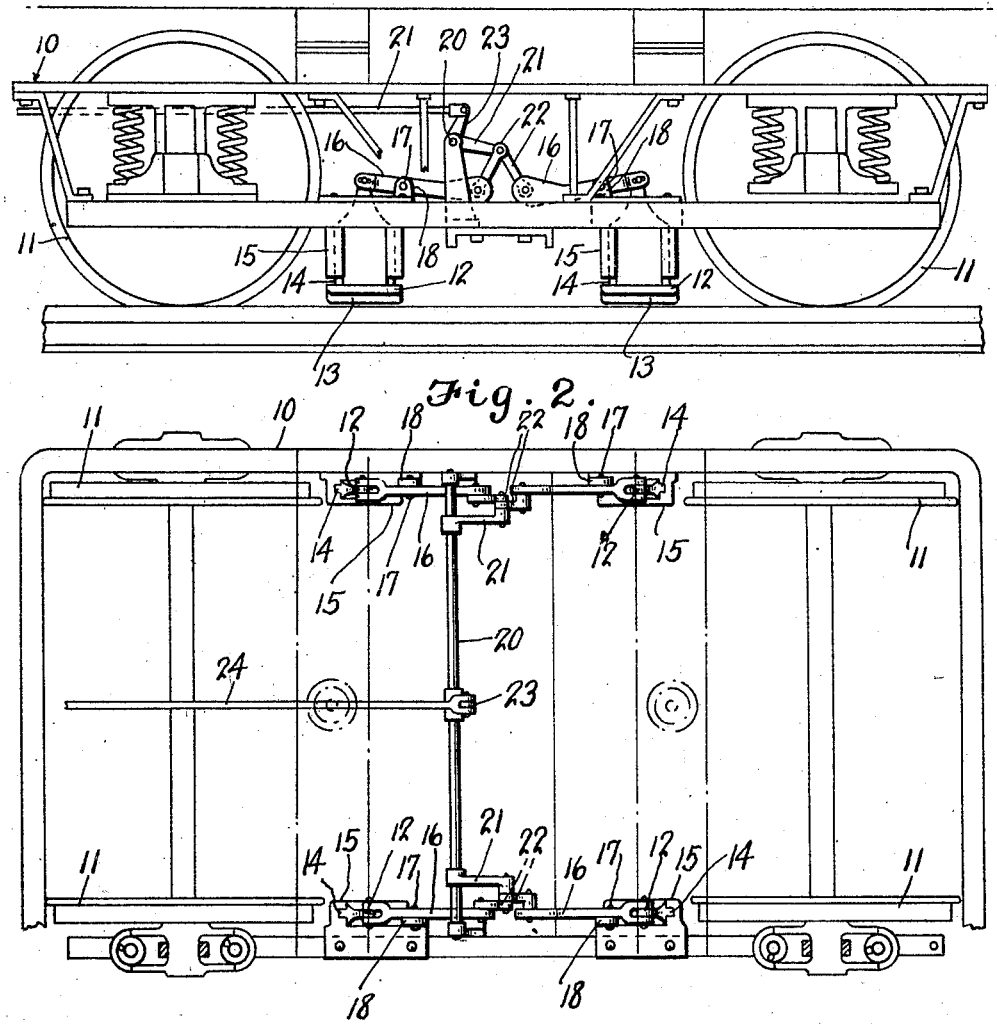

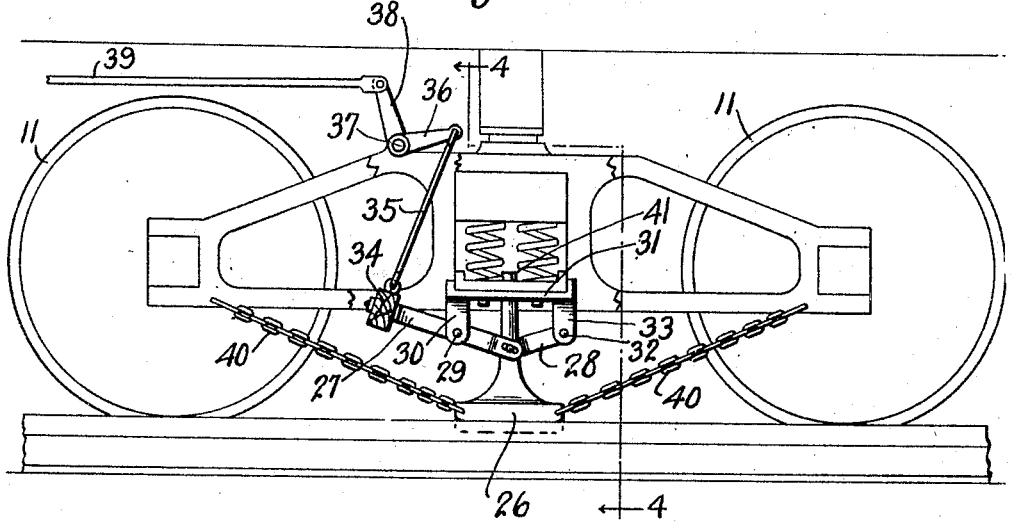
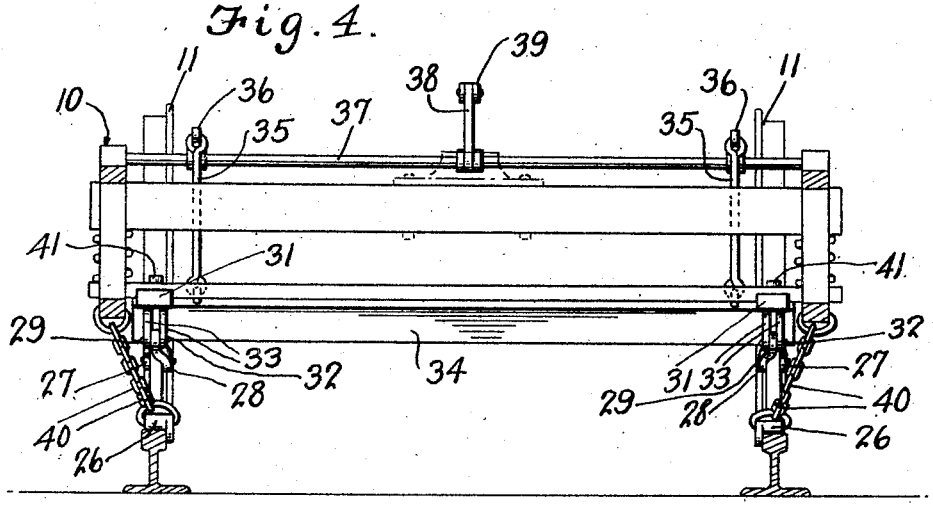
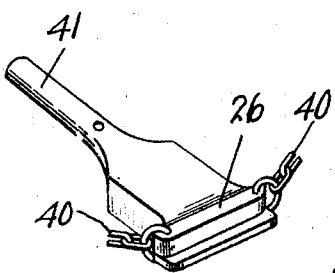

1,539,372

UNITED STATES PATENT OFFICE.

THOMAS SIMPSON, OF BEAUMONT, TEXAS.

BRAKE.

Application filed December 4, 1920. Serial No. 428,341.

*To all whom it may concern:*

Be it known that I, THOMAS SIMPSON, a citizen of the United States, residing at Beaumont, in the county of Jefferson and State of Texas, have invented new and useful Improvements in Brakes, of which the following is a specification.

This invention relates to railway brakes, wherein the brake shoes are mounted upon the truck of the car for vertical movement so as to effectively engage the rails of the track when in active position to gradually stop the car, in counter-distinction to the usual method of having the brake shoes engage the wheels with resulting injury thereto.

The nature and advantages of the invention will be better understood when the following detail description is read in connection with the accompanying drawings, the invention residing in the construction, combination and arrangement of parts as claimed.

In the drawings forming part of this application, like numerals of reference indicate similar parts in the several views and wherein:—

Figure 1 is a side elevation showing one form of the invention.

Figure 2 is a bottom plan view.

Figure 3 is a view similar to Figure 1 of a modified form of the invention.

Figure 4 is a sectional view taken on line 4—4 of Figure 3.

Figure 5 is a detail sectional view of one of the shoes.

Referring to the drawings in detail, 10 indicates the truck of a car which is mounted upon wheels 11. In accordance with the present invention a brake shoe 12 is arranged adjacent each wheel 11 and mounted for vertical adjustment. The brake shoe 12 is provided with a flange 13, while the web 14 of the shoe slides between suitable guides 15 depending from the truck 10. The upper end of each web is pivotally connected to a horizontally disposed lever 16, which is pivoted at a point between its ends, as at 17 to a bracket or lug 18 fixed upon the truck 10. It will be observed that the brake shoes for the rear wheels of the truck operate in pairs as do also the brake shoes for the front wheels of the truck, and that the horizontally disposed levers 16 extend from their respective shoes toward the transverse center of the truck 10.

Extended transversely of the truck and mounted for rotation is a shaft 20 having terminal crank portions 21 which are connected to the adjacent extremities of the levers 16 by means of suitable links 22. This shaft 20 is also provided with an intermediate crank portion 23 with which one end of an operating rod 24 is connected. The rod 24 may be manually operated, or it may extend to one of the cylinders of an air brake system to be operated in this way. The levers 16 are weighted at their free or inner ends so as to overbalance the brake shoes 12 and thereby normally maintain the shoes in spaced relation to the rails of the track. When it is desired to apply the brakes, the rod 24 is operated to rotate the shaft 20 in a direction to elevate the crank portions 21 and thereby exert an upward pull upon the adjacent ends of the levers 16. During this operation, the brake shoes 12 are forcibly moved into effective engagement with the rails of the track and thereby stop the car gradually. By reason of this construction, wear of the wheels 11 by having the brake shoes come in contact therewith is eliminated. When the rod 24 is released, the levers 16 assume their normal position under their own weight, and consequently automatically elevate the brake shoes 12.

In Figure 3 I have illustrated in modified form wherein a brake shoe 26 for each rail is positioned at a point midway between the wheels 11. Pivotally connected with said shoes are the adjacent extremities of links 27 and 28 respectively. The link 27 is fulcrumed at a point between its ends as at 29 on one lug 30 of a bracket 31, while the link 28 has its other end pivoted as at 32 to the other lug 33 of said bracket. A weight in the nature of a beam 34 extends transversely of the links 27. This beam functions to normally hold the brake shoes elevated above the rails, the beam being suspended by elements 35. The upper end of each element 35 is connected to one branch 36 of a bell crank lever fulcrumed as at 37, the remaining branch 38 connected to a brake rod 39. In practice, when a brake rod 39 is actuated to turn the bell crank lever upon its pivot, a pull is thereby exerted upon the elements 35 raising the weight beam 34, and moving the links upon their pivots to force the brake shoes 26 into effective engagement with the rails of the track. When the brake rod 39 is released, the weight beam 34 gravitates to its normal position, with a resultant movement of parts to space the brake shoes from the rails. The shoe 26 is guided in its movements by means of a stem 41, the links 27 and 28 being pivoted on said stem as shown. Secured to the opposite sides of the shoe 26 are the corresponding extremities of flexible elements such as chains or the like indicated at 40, the opposite ends of which chains are secured to the truck of the car, the chains operating to prevent lateral movement of the shoe as will be understood.

While it is believed that from the foregoing description the nature and advantages of the invention will be readily apparent, I desire to have it understood that I do not limit myself to what is herein shown and described, and that such changes may be resorted to when desired, as fall within the scope of what is claimed.

What I claim is:

In a brake mechanism, the combination with the truck of a railway car, a vertically movable rail engaging shoes supported upon the truck, a pair of levers pivoted intermediate their ends and each having operative connection with a shoe, a beam extending transversely across the truck and connected rigidly with the levers, a manually operable rock shaft, crank arms arranged on the rock shaft and fixed to rock therewith, and operative connections between the beam and the crank arms, the beam normally serving to hold the shoe above the rail.

In testimony whereof I affix my signature.

THOMAS SIMPSON.